United States Patent [19]

Sato et al.

[11] 4,406,523

[45] Sep. 27, 1983

[54] COMPACT WIDE-ANGLE ZOOM LENS

[75] Inventors: Sigetada Sato; Sadao Okudaira, both of Tokyo, Japan

[73] Assignee: Asahi Kogaku Kogyo Kabushiki Kaisha, Tokyo, Japan

[21] Appl. No.: 339,242

[22] Filed: Jan. 13, 1982

[30] Foreign Application Priority Data

Jan. 14, 1981 [JP] Japan .................... 56-4433

[51] Int. Cl.³ ............................................. G02B 15/14
[52] U.S. Cl. ........................................................ 350/426
[58] Field of Search ................................ 350/423, 426

[56] References Cited

U.S. PATENT DOCUMENTS

| 4,159,865 | 7/1979 | Kawamura et al. | 350/426 |
| 4,169,660 | 10/1979 | Nakamura | 350/426 |
| 4,241,981 | 12/1981 | Okudaira | 350/426 |

FOREIGN PATENT DOCUMENTS 52-20018  2/1977  Japan ........................ 350/426

Primary Examiner—John K. Corbin
Assistant Examiner—Scott J. Sugarman
Attorney, Agent, or Firm—Sughrue, Mion, Zinn, Macpeak and Seas

[57] ABSTRACT

A high performance compact wide angle zoom lens, composed, in order from the object side, of a divergent front lens group and a convergent rear lens group, wherein the front and rear lens groups are moved mechanically to thereby vary the overall focal length. The front lens group being composed, in order from the object side, of a first lens including a negative meniscus lens convex to the object, a second lens including a positive biconvex lens, a third lens including a negative meniscus lens convex to the object, a fourth lens including a negative lens and a fifth lens including a positive lens. The rear lens group being composed of a sixth lens including a positive lens, a seventh lens including a positive meniscus lens convex to the object, an eighth lens including a biconvex positive lens, a ninth lens including a biconcave negative lens, a tenth lens including a positive lens and an eleventh lens including a positive lens. The ninth lens being cemented to said eighth lens so that the wide angle zoom lens as a whole includes eleven lens elements grouped into ten lens components.

3 Claims, 8 Drawing Figures

COMPACT WIDE-ANGLE ZOOM LENS

BACKGROUND OF THE INVENTION

The present invention relates to a so-called retrofocus type wide angle zoom lens which is composed of a divergent front lens group and a convergent rear lens group which are mechanically moved to thereby vary the focal length.

Recently, zoom lenses for 35 mm single lens reflex cameras have extensively been used, and there have been strong demands for super compact lens systems in view of their portability.

On the other hand, in the zoom lenses, in order to meet the requirements that various aberrations be well corrected from the minimum focal length to the maximum focal length with a good balance, the diameter of the front lens be decreased to thereby miniaturize the overall lens system, and further the lens system be made to have a wide view angle, it is general to increase a refractive index of each lens, which leads to an expensive lens.

The present invention provides as an object a high performance zoom lens of wide angle, in which a view angle at the minimum focal length covers a wide angle of 85°, a zoom ratio is approximately two, a diameter of a front lens is about $0.88F_s$ which means a very compact physical size, and negative lenses included in the front lens group which is expensive because of its relatively large diameter have low refractive indexes, which leads to an economical lens.

In Japanese Laid-Open Patent Application No. 119919/79 is disclosed a very compact wide angle two lens group type zoom lens in which a view angle at the minimum focal length covers a wide angle 85°, a zoom ratio is approximately two and a diameter of the front lens is about $0.88F_s$. In this proposed lens, in order to decrease the number of the lens elements forming the front lens group in compliance with miniaturization, a first lens which is closest to the object must have a refractive index more than 1.8. As noted in the examples of the publication, refractive indexes of negative lenses included in the front lens group which has a large diameter are high as a result of which the lens system is expensive disadvantageously.

SUMMARY OF THE INVENTION

The present invention provides as an object a compact wide angle zoom lens which is superior to that of the above described Japanese Laid-Open Patent Application No. 119919/79. According to the present invention, the refractive indexes of the negative lenses included in the front lens group which has to be enlarged in its diameter are decreased, which leads to an economical production of a lens system, and various aberrations particularly spherical aberration and coma flare are well corrected over the total focal length range. This is achieved by a lens system in which a single low cost lens having a small diameter is added to the lens, positioned closest to the image, of the lens system disclosed in the Japanese Laid-Open Patent Application No. 119919/79. The lens system according to the invention is more clearly characterized by the following features.

DESCRIPTION OF THE PREFERRED EMBODIMENTS

Figure 1:
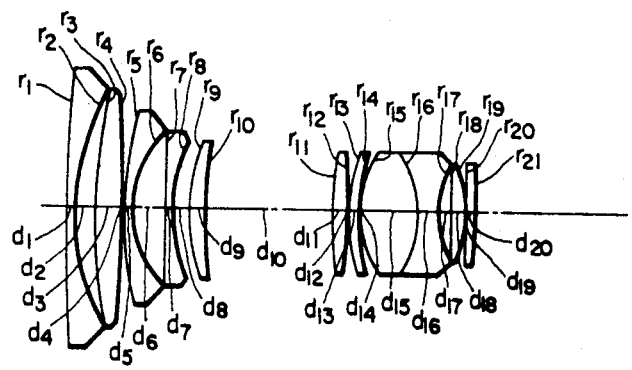
FIG. 1 is a construction of lens according to the Example 1 of the zoom lens system of the invention.
Figure 2:
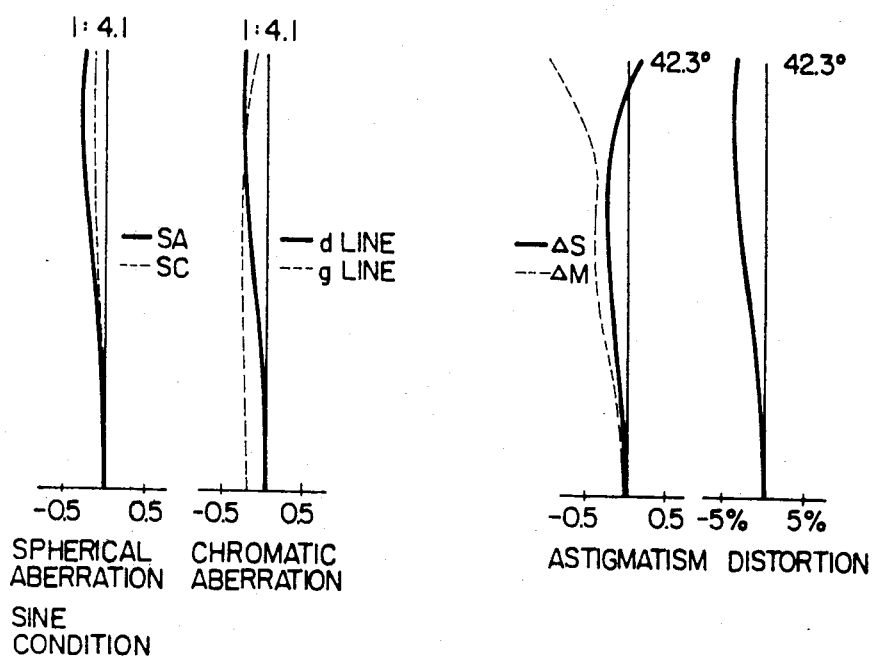
FIGS. 2, 3 and 4 are various aberration graphs at the minimum, intermediate and maximum focal length, respectively.
Figure 3:
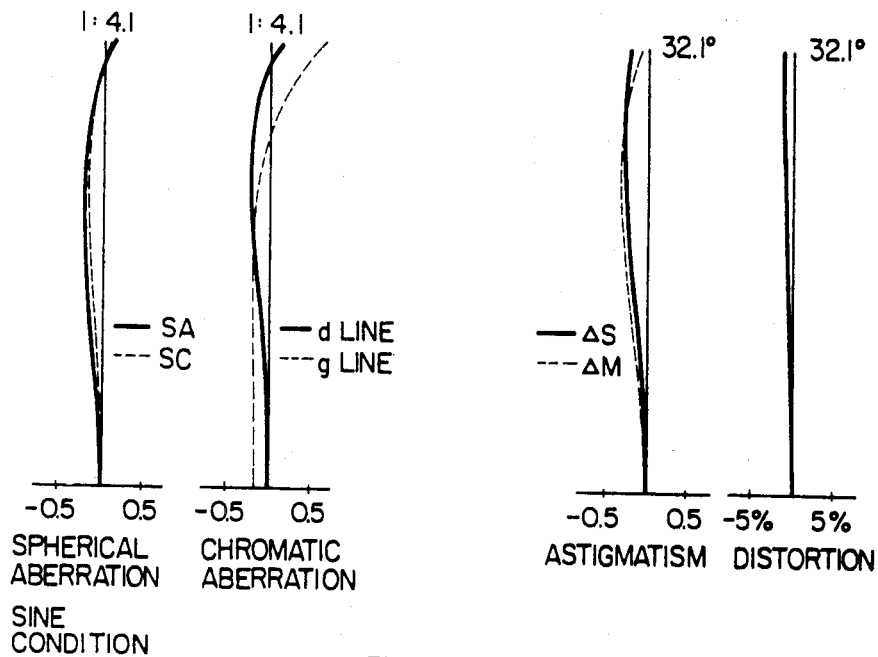
Figure 4:
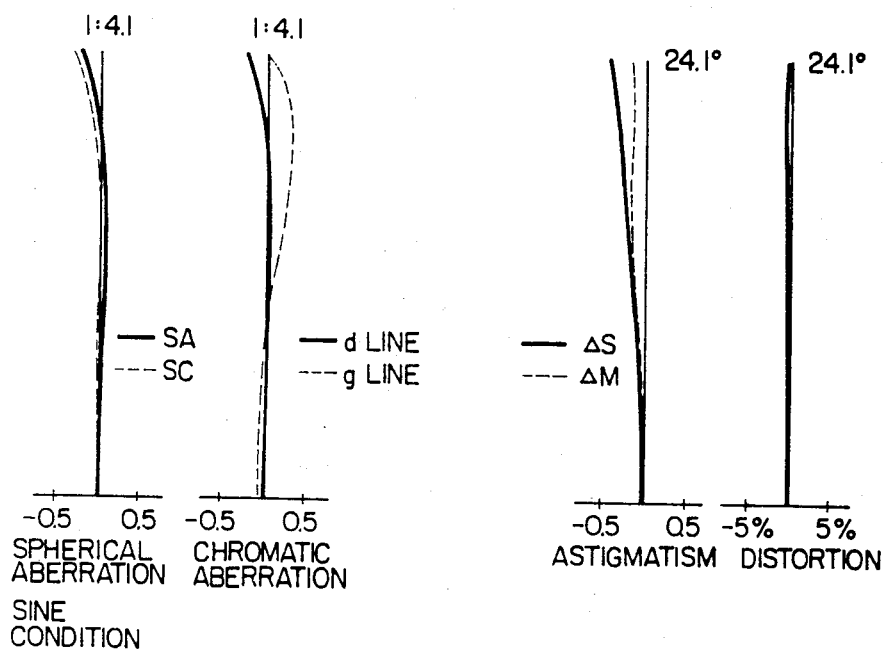
Figure 5:
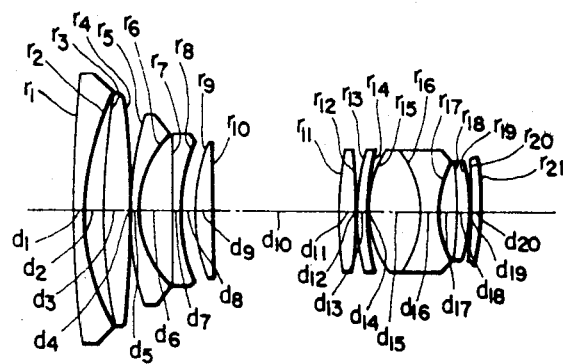
FIG. 5 is a construction of lens according to the Example 2 of the zoom lens system of the invention.
Figure 6:
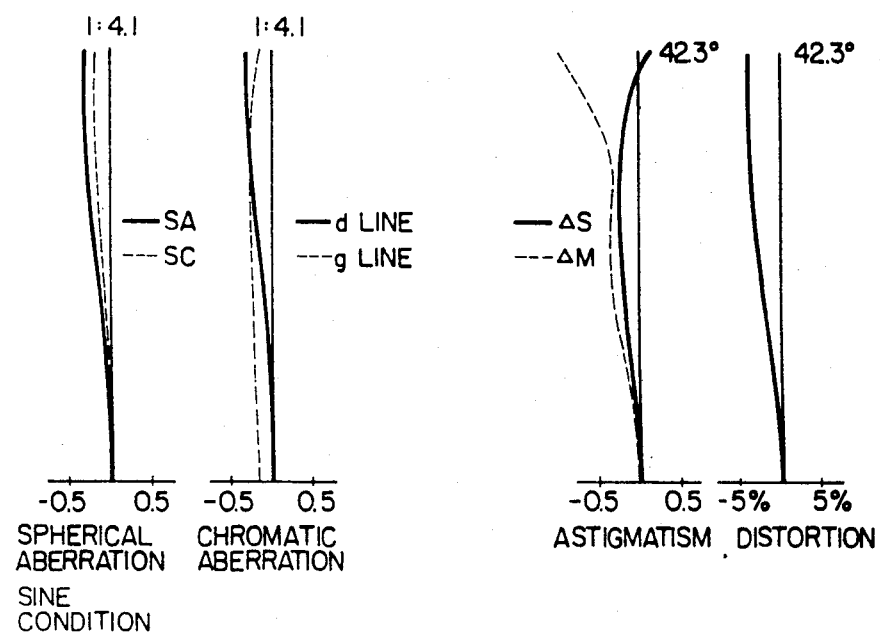
FIGS. 6, 7 and 8 are various aberration graphs at the minimum, intermediate and maximum focal length, respectively.
Figure 7:
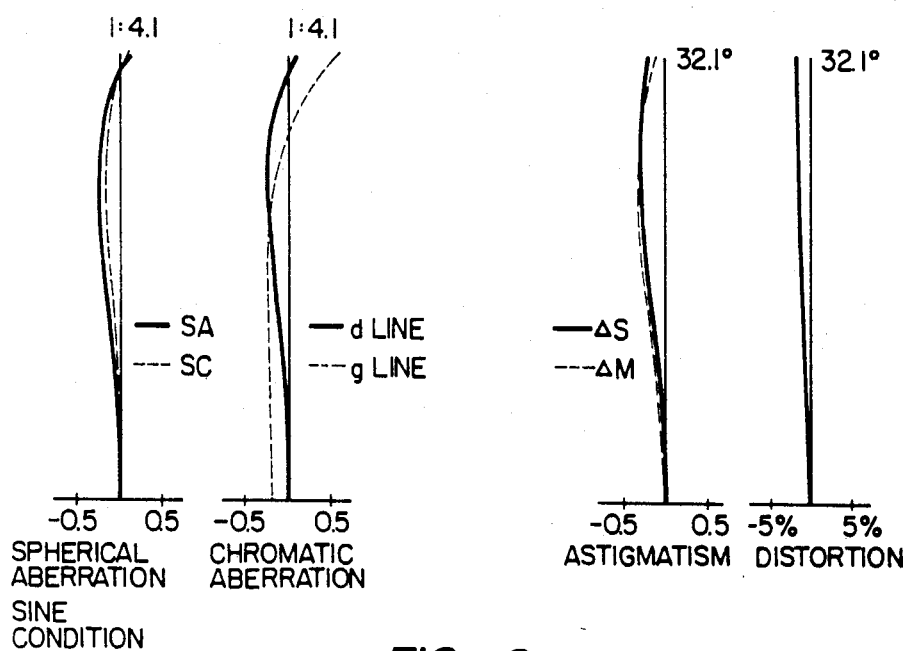
Figure 8:
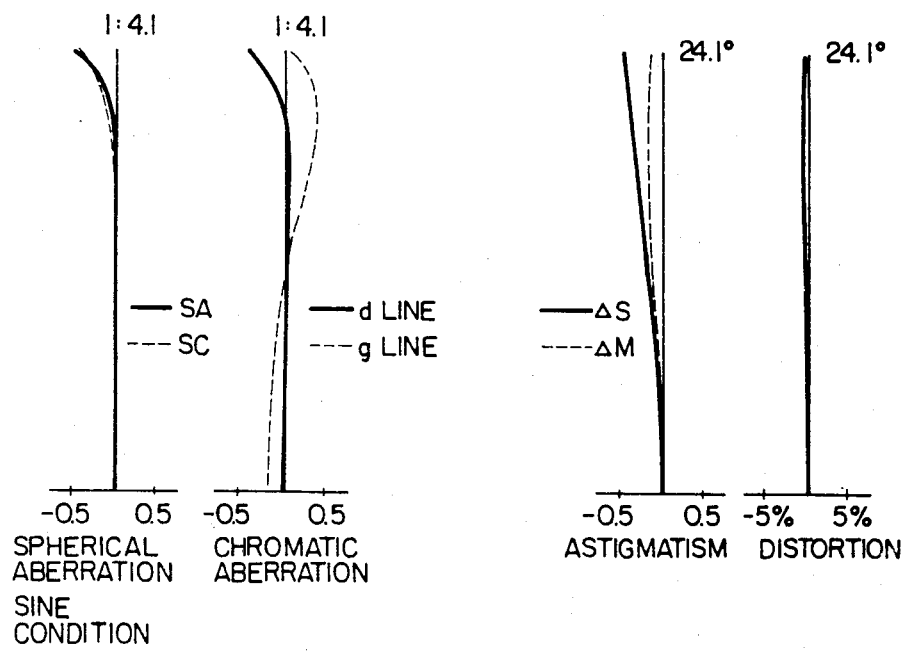

According to the present invention, a high performance compact wide angle zoom lens composed, in order from the object side, of a front lens group which is a divergent lens group and a rear lens group which is a convergent lens group, wherein the front and rear lens groups are moved mechanically to thereby vary the overall focal length. The front lens group is composed, in order from the object side, of a first lens—including a negative meniscus lens convex to the object, a second lens including a positive biconvex lens, a third lens including a negative meniscus lens convex to the object, a fourth lens including a negative lens and a fifth lens including a positive lens, and the rear lens group being composed of a sixth lens including a positive lens, a seventh lens including a positive meniscus lens convex to the object, an eighth lens including a biconvex positive lens, a ninth lens including a biconcave negative lens, the ninth lens being cemented to the eighth lens, a tenth lens including a positive lens and an eleventh lens including a positive lens. The wide angle zoom lens as a whole includes eleven lens elements grouped into ten lens components and satisfying the following conditions:

$$1.1F_s < |f_a| < 1.5F_s \quad (1)$$

$$0.7F_s < L < 1.1F_s \quad (2)$$

$$2.3 < f_{3,4}/|f_a| < 2.9 \quad (3)$$

$$0.8 < f_{5,6}/f_a < 1.4 \quad (4)$$

$$1.64 < n_4 \quad (5)$$

$$5.5 < f_{8,9}/|f_a| < 10.0 \quad (6)$$

$$1.4 < f_{11,12}/f_b < 2.2 \quad (7)$$

$$0.6 < |f_{17}|/f_b < 0.95 \quad (8)$$

where $F_s$ is the minimum focal length of the overall lens system;

$f_a$ is the focal length of the front lens group;

L is the air gap between the front and rear lens groups at the minimum focal length of the overall focal length;

$f_{3,4}$ is the focal length of the second lens;

$f_{5,6}$ is the focal length of the third lens;

$n_4$ is the refractive index of the fourth lens at d-line;

$f_{8,9}$ is the focal length from the image-side surface of the fourth lens to the object-side surface of the fifth lens;

$f_{11,12}$ is the focal length of the sixth lens;

$f_{17}$ is the focal length of the image-side surface of the ninth lens; and $f_b$ is the focal length of the rear lens group.

The above described conditions will now be explained in detail.

The condition (1) is selected to define the basic construction for a zoom lens system and is required to realize a miniaturization.

When the lower limit of the condition (1) is exceeded, it is available to miniaturize the lens system but the movement of the rear lens group is increased so that a width of incident light in the rear lens group on the maximum focal length side is increased. Therefore, spherical aberration and coma aberration are inevitably degraded. When the upper limit of the condition (1), since the variation in air gap between the front and rear lens groups is increased, the overall physical size of the lens system is increased on the minimum focal length side. At the same time, this makes it difficult to decrease a diameter of a front lens while introducing a sufficient amount of marginal light, which is disadvantageous for miniaturization of the lens system.

The conditions (2) to (8) are selected to cooperate with each other in order to maintain various aberrations in a good condition while meeting the condition (1).

When the upper limit of the condition (2) is exceeded, since an oblique light with respect to a diameter of a front lens group intended for use in the present invention is allowed to pass the marignal portions of the rear lenses, various aberrations, particularly coma aberration are difficult to compensate for. Inversely, below the lower limit of the condition (2), since the refractive power of the rear lens group necessarily increases in order to meet the requirement of the view angle and the zoom ratio in the present invention, variation in spherical aberration from the minimum focal length to the maximum focal length is increased so that the spherical aberration is difficult to compensate for.

The condition (3) is required to compensate for distortion in the positive direction at the minimum focal length and to miniaturize the lens system. If the upper limit of the condition (3) is exceeded, it is difficult to correct a negative distortion on the minimum focal length side, and also diameters of the respective lenses after the third lens are increased, which is not desired in miniaturization. If the lower limit of the condition (3) is exceeded, the curvature of field becomes negative on the minimum focal length side. In order to eliminate this defect, it is necessary to increase the refractive power of the image-side surface of the third lens, which in turn degrades the spherical aberration on the maximum focal length side.

The above described conditions (1), (2) and (3) are selected to somewhat overlap with the conditions (1), (2) and (4) of the aforesaid Japanese Laid-Open Patent Application No. 119919/79. However, the purpose of the invention that a high performance and economical lens is provided is attained by satisfying the following conditions (4) to (7), simultaneously.

When the upper limit of the condition (4) is exceeded, it is available for compensation for negative distortion at the minumum focal length, but the coma aberration is not completely corrected and a negative power of the overall front lens group is made to be weak. As a result, the miniaturization is not attained and the condition (1) is not met. When the lower limit of the condition (4) is exceeded, negative distortion is increased and spherical aberration at the maximum focal length is increased excessively. It is very difficult to compensate for the aberrations by the other parts of the lens system.

The condition (5) is required to maintain at small values the refractive indexes of the first lens having a relatively large physical configuration and the third lens, and is concerned with the fourth lens having a relatively small size. When the lower limit of the condition (5) is exceeded, the optical load imposed on these lenses is increased because the negative refractive power of the overall front lens group must be increased. As a result, in order to compensate for aberrations it is required to increase the refractive indexes, which makes it difficult to manufacture a lens system in low cost.

The condition (6) is required to maintain a balance between spherical aberration and coma aberration particularly at the maximum focal length. When the upper limit of the condition (6) is exceeded, the effect for compensation for spherical aberration of the object-side surface of the fifth lens, which is a strong positive power surface, in the negative direction, is eliminated and it is also impossible to increase the negative refractive power of the overall front lens group, which leads to a disadvantage in miniaturization. When the lower limit of the condition (6), the effect for off-set of aberrations between the image-side surface of the fourth lens and the object-side surface of the fifth lens is too remarkable so that a balance between the spherical aberration and the coma aberration is degraded. Also, in order to satisfy the condition (1), it is required to increase negative refractive powers of the first lens and the third lens, and in order to correct various aberrations well, the refractive indexes of these lenses must be increased, which leads to difficulty in attaining the purpose of the present invention.

When the upper limit of the condition (7) is exceeded, it is difficult to compensate for the coma aberration generated in the image-side surface of the ninth lens in the rear lens group at the minimum focal length. When the lower limit of the condition (7) is exceeded, the curvature of field becomes negative over the overall focal length range. In order to correct this defect, it is necessary to increase a negative refractive power of the object-side surface of the negative lens included in the rear lens group. As a result, it is difficult to compensate for the excessive spherical aberration generated in the lens in question.

When the upper limit of the condition (8) is exceeded, an effect of compensation for negative distortion on the minimum focal length side is made to be little, and astigmatism of the variation range of the focal length is compensated for with difficulty. When the lower limit of the condition (8) is exceeded, the spherical aberration at the maximum focal length is excessive, and a great amount of outward coma aberration may be generated over the variation range of the focal length. It is very difficult to compensate for the aberration in the other parts of the lens system.

The Examples according to the present invention will now be described in which:

F is the overall focal length, $r_i$ is the radius of curvature of the i-th lens counted from the object side, $d_i$ is the distance between the lens surfaces of the i-th surface and the adjacent surface, counted from the object side, $n_i$ is the refractive index of the i-th lens counted from the object side at d-line, and $\nu_i$ is the Abbe number of the i-th lens counted from the object side.

EXAMPLE 1

$F = 24.7 \sim 48.5$

| | | | | | | | |
|---|---|---|---|---|---|---|---|
| $r_1$ | 247.074 | $d_1$ | 1.70 | $n_1$ | 1.54072 | $\nu_1$ | 47.2 |
| $r_2$ | 37.244 | $d_2$ | 3.08 | | | | |
| $r_3$ | 75.387 | $d_3$ | 4.81 | $n_2$ | 1.62588 | $\nu_2$ | 35.7 |
| $r_4$ | −184.489 | $d_4$ | 0.10 | | | | |
| $r_5$ | 53.488 | $d_5$ | 1.60 | $n_3$ | 1.68893 | $\nu_3$ | 31.1 |
| $r_6$ | 16.502 | $d_6$ | 5.59 | | | | |
| $r_7$ | 379.712 | $d_7$ | 1.40 | $n_4$ | 1.73400 | $\nu_4$ | 51.5 |
| $r_8$ | 25.372 | $d_8$ | 2.50 | | | | |
| $r_9$ | 24.861 | $d_9$ | 3.34 | $n_5$ | 1.78472 | $\nu_5$ | 25.7 |
| $r_{10}$ | 97.487 | $d_{10}$ | 22.41 ∼ 2.78 | | | | |
| $r_{11}$ | 66.811 | $d_{11}$ | 2.94 | $n_6$ | 1.56873 | $\nu_6$ | 63.2 |
| $r_{12}$ | −66.091 | $d_{12}$ | 0.10 | | | | |
| $r_{13}$ | 33.883 | $d_{13}$ | 1.86 | $n_7$ | 1.51633 | $\nu_7$ | 64.1 |
| $r_{14}$ | 37.382 | $d_{14}$ | 0.56 | | | | |
| $r_{15}$ | 20.272 | $d_{15}$ | 9.36 | $n_8$ | 1.64769 | $\nu_8$ | 33.8 |
| $r_{16}$ | −17.429 | $d_{16}$ | 4.07 | $n_9$ | 1.80518 | $\nu_9$ | 25.4 |
| $r_{17}$ | 18.826 | $d_{17}$ | 2.03 | | | | |
| $r_{18}$ | −275.409 | $d_{18}$ | 2.48 | $n_{10}$ | 1.51454 | $\nu_{10}$ | 54.7 |
| $r_{19}$ | −20.378 | $d_{19}$ | 0.10 | | | | |
| $r_{20}$ | −271.638 | $d_{20}$ | 1.68 | $n_{11}$ | 1.51814 | $\nu_{11}$ | 45.8 |
| $r_{21}$ | −69.966 | | | | | | |

$L = 0.91 F_s$
$f_{5,6}/f_a = 1.08$   $|f_a| = 1.32 F_s$   $f_{8,9}/|f_a| = 7.02$
$f_{11,12}/f_b = 1.94$   $f_{3,4}/|f_a| = 2.65$   $|f_{17}|/f_b = 0.77$

EXAMPLE 2

$F = 24.7 \sim 48.5$

| | | | | | | | |
|---|---|---|---|---|---|---|---|
| $r_1$ | 165.691 | $d_1$ | 1.70 | $n_1$ | 1.59551 | $\nu_1$ | 39.2 |
| $r_2$ | 35.910 | $d_2$ | 3.25 | | | | |
| $r_3$ | 77.409 | $d_3$ | 4.62 | $n_2$ | 1.65016 | $\nu_2$ | 39.4 |
| $r_4$ | −191.023 | $d_4$ | 0.10 | | | | |
| $r_5$ | 54.535 | $d_5$ | 1.60 | $n_3$ | 1.69700 | $\nu_3$ | 48.5 |
| $r_6$ | 16.779 | $d_6$ | 5.86 | | | | |
| $r_7$ | 833.168 | $d_7$ | 1.40 | $n_4$ | 1.67790 | $\nu_4$ | 55.3 |
| $r_8$ | 25.082 | $d_8$ | 2.31 | | | | |
| $r_9$ | 24.201 | $d_9$ | 3.18 | $n_5$ | 1.69895 | $\nu_5$ | 30.1 |
| $r_{10}$ | 122.814 | $d_{10}$ | 22.11 ∼ 2.41 | | | | |
| $r_{11}$ | 49.452 | $d_{11}$ | 2.87 | $n_6$ | 1.56873 | $\nu_6$ | 63.2 |
| $r_{12}$ | −76.259 | $d_{12}$ | 0.10 | | | | |
| $r_{13}$ | 33.414 | $d_{13}$ | 2.18 | $n_7$ | 1.51633 | $\nu_7$ | 64.1 |
| $r_{14}$ | 38.051 | $d_{14}$ | 0.37 | | | | |
| $r_{15}$ | 20.451 | $d_{15}$ | 8.40 | $n_8$ | 1.64769 | $\nu_8$ | 33.8 |
| $r_{16}$ | −18.192 | $d_{16}$ | 3.53 | $n_9$ | 1.80518 | $\nu_9$ | 25.4 |
| $r_{17}$ | 18.116 | $d_{17}$ | 2.54 | | | | |
| $r_{18}$ | −204.730 | $d_{18}$ | 2.79 | $n_{10}$ | 1.52630 | $\nu_{10}$ | 51.2 |
| $r_{19}$ | −22.484 | $d_{19}$ | 0.10 | | | | |
| $r_{20}$ | −63.841 | $d_{20}$ | 1.79 | $n_{11}$ | 1.54072 | $\nu_{11}$ | 47.2 |
| $r_{21}$ | −33.959 | | | | | | |

$L = 0.90 F_s$
$f_{3,4}/|f_a| = 2.64$   $|f_{17}|/f_b = 1.73$   $f_{11,12}/f_b = 1.73$
$f_{8,9}/|f_a| = 8.47$   $f_{5,6}/f_a = 1.10$   $|f_a| = 1.31 F_s$

What is claimed is:

1. A high performance compact wide zoom angle lens, composed, in order from the object side, of a divergent front lens group and a convergent rear lens group, wherein said front and rear lens groups are moved mechanically to thereby vary the overall focal length, said front lens group being composed, in order from the object side, of a first lens including a negative meniscus lens convex to the object, a second lens including a positive biconvex lens, a third lens including a negative meniscus lens convex to the object, a fourth lens including a negative lens and a fifth lens including a positive lens, and said rear lens group being composed of a sixth lens including a positive lens, a seventh lens including a positive meniscus lens convex to the object, an eighth lens including a biconvex positive lens, a ninth lens including a biconcave negative lens, a tenth lens including a positive lens and an eleventh lens including a positive lens, said ninth lens being cemented to said eighth lens, said wide angle zoom lens as a whole including eleven lens elements grouped into ten lens components and satisfying the following conditions:

$$1.1 F_S < |f_a| < 1.5 F_S \quad (1)$$

$$0.7 F_S < L < 1.1 F_S \quad (2)$$

$$2.3 < f_{3,4}/|f_a| < 2.9 \quad (3)$$

$$0.8 < f_{5,6}/f_a < 1.4 \quad (4)$$

$$1.64 < n_4 \quad (5)$$

$$5.5 < f_{8,9}/|f_a| < 10.0 \quad (6)$$

$$1.4 < f_{11,12}/f_b < 2.2 \quad (7)$$

$$0.6 < |f_{17}|/f_b < 0.95 \quad (8)$$

where $F_S$ is the minimum focal length of the overall lens system;

$f_a$ is the focal length of the front lens group;

L is the air gap between the front and rear lens group at the minimum focal length of the overall focal length;

$f_{3,4}$ is the focal length of the second lens;

$f_{5,6}$ is the focal length of the third lens;

$n_4$ is the refractive index of the fourth lens at d-line;

$f_{8,9}$ is the focal length from the image-side surface of the fourth lens to the object-side surface of the fifth lens;

$f_{11,12}$ is the focal length of the sixth lens;

$f_{17}$ is the focal length of the image-side surface of the ninth lens; and $f_b$ is the focal length of the rear lens group.

2. A high performance compact wide zoom angle lens, composed, in order from the object side, of a divergent front lens group and a convergent rear lens group, wherein said front and rear lens groups are moved mechanically to thereby vary the overall focal length, said front lens group being composed, in order from the object side, of a first lens including a negative meniscus lens convex to the object, a second lens including a positive biconvex lens, a third lens including a negative meniscus lens convex to the object, a fourth lens including a negative lens and a fifth lens including a positive lens, and said rear lens group being composed of a sixth lens including a positive lens, a seventh lens including a positive meniscus lens convex to the object, an eighth lens including a biconvex positive lens, a ninth lens including a biconcave negative lens, a tenth lens including a positive lens and an eleventh lens including a positive lens, said ninth lens being cemented to said eighth lens, said wide angle zoom lens as a whole including eleven lens elements grouped into ten lens components and satisfying the following chart:

$F = 24.7 \sim 48.5$

| | | | | | | | |
|---|---|---|---|---|---|---|---|
| $r_1$ | 247.074 | $d_1$ | 1.70 | $n_1$ | 1.54072 | $\nu_1$ | 47.2 |
| $r_2$ | 37.244 | $d_2$ | 3.08 | | | | |
| $r_3$ | 75.387 | $d_3$ | 4.81 | $n_2$ | 1.62588 | $\nu_2$ | 35.7 |
| $r_4$ | −184.489 | $d_4$ | 0.10 | | | | |
| $r_5$ | 53.488 | $d_5$ | 1.60 | $n_3$ | 1.68893 | $\nu_3$ | 31.1 |
| $r_6$ | 16.502 | $d_6$ | 5.59 | | | | |
| $r_7$ | 379.712 | $d_7$ | 1.40 | $n_4$ | 1.73400 | $\nu_4$ | 51.5 |
| $r_8$ | 25.372 | $d_8$ | 2.50 | | | | |
| $r_9$ | 24.861 | $d_9$ | 3.34 | $n_5$ | 1.78472 | $\nu_5$ | 25.7 |

-continued

| | | | | | | |
|---|---|---|---|---|---|---|
| $r_{10}$ | 97.487 | $d_{10}$ | 22.41 ~ 2.78 | | | |
| $r_{11}$ | 66.811 | $d_{11}$ | 2.94 | $n_6$ | 1.56873 $\nu_6$ | 63.2 |
| $r_{12}$ | −66.091 | $d_{12}$ | 0.10 | | | |
| $r_{13}$ | 33.883 | $d_{13}$ | 1.86 | $n_7$ | 1.51633 $\nu_7$ | 64.1 |
| $r_{14}$ | 37.382 | $d_{14}$ | 0.56 | | | |
| $r_{15}$ | 20.272 | $d_{15}$ | 9.36 | $n_8$ | 1.64769 $\nu_8$ | 33.8 |
| $r_{16}$ | −17.429 | $d_{16}$ | 4.07 | $n_9$ | 1.80518 $\nu_9$ | 25.4 |
| $r_{17}$ | 18.826 | $d_{17}$ | 2.03 | | | |
| $r_{18}$ | −275.409 | $d_{18}$ | 2.48 | $n_{10}$ | 1.51454 $\nu_{10}$ | 54.7 |
| $r_{19}$ | −20.378 | $d_{19}$ | 0.10 | | | |
| $r_{20}$ | −271.638 | $d_{20}$ | 1.68 | $n_{11}$ | 1.51814 $\nu_{11}$ | 45.8 |
| $r_{21}$ | −69.966 | | | | | |

$L = 0.91 F_s$ $f_{5,6}/f_a = 1.08$ $|f_a| = 1.32 F_s$ $f_{8,9}/|f_a| = 7.02$
$f_{11,12}/f_b = 1.94$ $f_{3,4}/|f_a| = 2.65$ $|f_{17}|/f_b = 0.77$ where F is the overall focal length;

$r_i$ is the radius of curvature of the i-th lens counted from the object side;

$d_i$ is the distance between the lens surfaces of the i-th surface and the adjacent surface, counted from the object side;

$n_i$ is the refractive index of the i-th lens counted from the object side at d-line;

$\nu_i$ is the Abbe number of the i-th lens counted from the object side;

$F_s$ is the minimum focal length of the overall lens system;

$f_a$ is the focal length of the front lens group;

L is an air gap between the front and rear lens groups at the minimum focal length of the overall focal length;

$f_{3,4}$ is the focal length of the second lens;

$f_{5,6}$ is the focal length of the third lens;

$n_4$ is the refractive index of the fourth lens at d-line;

$f_{8,9}$ is the focal length from the image-side surface of the fourth lens to the object-side surface of the fifth lens;

$f_{11,12}$ is the focal length of the sixth lens;

$f_{17}$ is the focal length of the image-side surface of the ninth lens; and $f_b$ is the focal length of the rear lens group.

3. A high performance compact wide zoom angle lens, composed, in order from the object side, of a divergent front lens group and a convergent rear lens group, wherein said front and rear lens groups are moved mechanically to thereby vary the overall focal length, said front lens group being composed, in order from the object side, of a first lens including a negative meniscus lens convex to the object, a second lens including a positive biconvex lens, a third lens including a negative meniscus lens convex to the object, a fourth lens including a negative lens and a fifth lens including a positive lens, and said rear lens group being composed of a sixth lens including a positive lens, a seventh lens including a positive meniscus lens convex to the object, an eighth lens including a biconvex positive lens, a ninth lens including a biconcave negative lens, a tenth lens including a positive lens and an eleventh lens including a positive lens, said ninth lens being cemented to said eighth lens, said wide angle zoom lens as a whole including eleven lens elements grouped into ten lens components and satisfying the following chart:

$F = 24.7 \sim 48.5$

| | | | | | | |
|---|---|---|---|---|---|---|
| $r_1$ | 165.691 | $d_1$ | 1.70 | $n_1$ | 1.59551 $\nu_1$ | 39.2 |
| $r_2$ | 35.910 | $d_2$ | 3.25 | | | |
| $r_3$ | 77.409 | $d_3$ | 4.62 | $n_2$ | 1.65016 $\nu_2$ | 39.4 |
| $r_4$ | −191.023 | $d_4$ | 0.10 | | | |
| $r_5$ | 54.535 | $d_5$ | 1.60 | $n_3$ | 1.69700 $\nu_3$ | 48.5 |
| $r_6$ | 16.779 | $d_6$ | 5.86 | | | |
| $r_7$ | 833.168 | $d_7$ | 1.40 | $n_4$ | 1.67790 $\nu_4$ | 55.3 |
| $r_8$ | 25.082 | $d_8$ | 2.31 | | | |
| $r_9$ | 24.201 | $d_9$ | 3.18 | $n_5$ | 1.69895 $\nu_5$ | 30.1 |
| $r_{10}$ | 122.814 | $d_{10}$ | 22.11 ~ 2.41 | | | |
| $r_{11}$ | 49.452 | $d_{11}$ | 2.87 | $n_6$ | 1.56873 $\nu_6$ | 63.2 |
| $r_{12}$ | −76.259 | $d_{12}$ | 0.10 | | | |
| $r_{13}$ | 33.414 | $d_{13}$ | 2.18 | $n_7$ | 1.51633 $\nu_7$ | 64.1 |
| $r_{14}$ | 38.051 | $d_{14}$ | 0.37 | | | |
| $r_{15}$ | 20.451 | $d_{15}$ | 8.40 | $n_8$ | 1.64769 $\nu_8$ | 33.8 |
| $r_{16}$ | −18.192 | $d_{16}$ | 3.53 | $n_9$ | 1.80518 $\nu_9$ | 25.4 |
| $r_{17}$ | 18.116 | $d_{17}$ | 2.54 | | | |
| $r_{18}$ | −204.730 | $d_{18}$ | 2.79 | $n_{10}$ | 1.52630 $\nu_{10}$ | 51.2 |
| $r_{19}$ | −22.484 | $d_{19}$ | 0.10 | | | |
| $r_{20}$ | −63.841 | $d_{20}$ | 1.79 | $n_{11}$ | 1.54072 $\nu_{11}$ | 47.2 |
| $r_{21}$ | −33.959 | | | | | |

$L = 0.90 F_s$ $f_{3,4}/|f_a| = 2.64$ $|f_{17}|/f_b = 1.73$ $f_{11,12}/f_b = 1.73$
$f_{8,9}/|f_a| = 8.47$ $f_{5,6}/f_a = 1.10$ $|f_a| = 1.31 F_s$ where F is the overall focal length;

$r_i$ is the radius of curvatuve of the i-th lens counted from the object side;

$d_i$ is the distance between the lens surface of the i-th surface and the adjacent surface, counted from the object side;

$n_i$ is the refractive index of the i-th lens counted from the object side at d-line;

$\nu_i$ is the Abbe number of the i-th lens counted from the object side;

$F_s$ is the minimum focal length of the overall lens system;

$f_a$ is the focal length of the front lens group;

L is an air gap between the front and rear lens groups at the minimum focal length of the overall focal length;

$f_{3,4}$ is the focal length of the second lens;

$f_{5,6}$ is the focal length of the third lens;

$n_4$ is the refractive index of the fourth lens at d-line;

$f_{8,9}$ is the focal length from the image-side surface of the fourth lens to the object-side surface of the fifth lens;

$f_{11,12}$ is the focal length of the sixth lens;

$f_{17}$ is the focal length of the image-side surface of the ninth lens; and $f_b$ is the focal length of the rear lens group.

* * * * *